(12) United States Patent
Wagner

(10) Patent No.: US 7,194,657 B2
(45) Date of Patent: Mar. 20, 2007

(54) CONTROL AND POWER SUPPLY SYSTEM FOR AT LEAST TWO AIRPLANE SEATS

(75) Inventor: Wolfgang Wagner, Friedrichshafen (DE)

(73) Assignee: Recaro Aircraft Seating GmbH & Co. KG, Schwäbisch Hall (DE)

( * ) Notice: Subject to any disclaimer, the term of this patent is extended or adjusted under 35 U.S.C. 154(b) by 251 days.

(21) Appl. No.: 10/485,686

(22) PCT Filed: Sep. 20, 2002

(86) PCT No.: PCT/DE02/03525

§ 371 (c)(1), (2), (4) Date: Feb. 3, 2004

(87) PCT Pub. No.: WO03/031220

PCT Pub. Date: Apr. 17, 2003

(65) Prior Publication Data

US 2004/0181295 A1    Sep. 16, 2004

(30) Foreign Application Priority Data

Oct. 2, 2001    (DE) ................ 101 48 810

(51) Int. Cl.
G06F 11/00    (2006.01)
(52) U.S. Cl. .................... 714/14; 714/22
(58) Field of Classification Search .......... 714/14, 714/22
See application file for complete search history.

(56) References Cited

U.S. PATENT DOCUMENTS

| | | | | |
|---|---|---|---|---|
| 4,607,330 A | * | 8/1986 | McMurray et al. ........... 714/14 |
| 4,914,539 A | * | 4/1990 | Turner et al. ................ 361/18 |
| 6,094,604 A | | 7/2000 | Bucher et al. |
| 6,194,853 B1 | * | 2/2001 | Tual et al. .................. 318/256 |
| 6,381,503 B1 | * | 4/2002 | Dollhopf et al. .............. 700/22 |
| 6,502,206 B1 | * | 12/2002 | Kosuge et al. ................ 714/13 |
| 6,629,000 B1 | * | 9/2003 | Moon et al. .................. 700/94 |
| 6,719,245 B2 | * | 4/2004 | Wagner .................... 244/118.5 |
| 6,950,897 B2 | * | 9/2005 | Hensley et al. ............. 710/305 |

FOREIGN PATENT DOCUMENTS

| | | |
|---|---|---|
| EP | 0 973 079 A1 | 1/2000 |
| EP | 1 028 512 A2 | 8/2000 |
| GB | 2318429 A | 4/1998 |

\* cited by examiner

Primary Examiner—Scott Baderman
Assistant Examiner—Joshua Lohn
(74) Attorney, Agent, or Firm—Roylance, Abrams, Berdo & Goodman, L.L.P.

(57) ABSTRACT

A control and power supply system for the actuators of at least two airplane seats, which are preferably adjacent. The actuators of an airplane seat and the actuators of at least one other airplane seat are connected to a common control unit by a data link device. Each actuator can be supplied by at least two power units. In case of control unit failure, at least one actuator takes over the function of the control unit. For uncoupling defective parts of the corresponding bus structure, all the actuators are provided with elements for cutting the ingoing and outgoing data lines and power lines.

7 Claims, 4 Drawing Sheets

CONTROL AND POWER SUPPLY SYSTEM FOR AT LEAST TWO AIRPLANE SEATS

FIELD OF THE INVENTION

The present invention relates to a control and power supply system for actuators in aircraft seats.

BACKGROUND OF THE INVENTION

In the control units, drive units and other configuration alteration elements of an aircraft seat, serious faults can occur. Such faults can include loose or detached plugs or other connectors, cable breaks, short circuits to ground or another power supply line, failed control units and failures of drive units or input devices or controls, which can be, for example, buttons, switches, and chip-card readers, possibly with a display.

SUMMARY OF THE INVENTION

A first object of the present invention is to provide a system in which the function of the drive units or other configuration alteration elements is ensured.

The present invention involves a redundancy concept which is fault tolerant.

The system in the present invention includes a number of drive units and monitoring units or actuators. The number is matched to the respective aircraft seat. These elements of at least two preferably adjacent aircraft seats are in the form of a bus structure. The system can, however, also comprise elements of three or more aircraft seats.

The system of the present invention contains only one single common control unit for at least two aircraft seats. This control unit controls the actuators by a data link device. The user controls the actuators relevant to his seat by its control element which has intelligence or at least a driver for the data link device. In doing so, the data from the control element is routed from the control element by the data link device used by all elements to the control unit. The control unit then in turn triggers a corresponding reaction at the actuators by the data link device. This reaction is preferably reported by acknowledgments of the actuators by the data link device to the control unit. The latter monitors and optionally controls the entire sequence of motion.

In the present invention, the actuators are intelligent. An expanded range of tasks is assigned to them in case of a fault of the control unit. If the control unit fails for any reason or it outputs illogical data due to a defect, this malfunction is recognized by the actuators. In a special routine, they decide to take over the operation of the control unit by their distributed intelligence. Each actuator reports its data relevant to the remaining actuators to the data link device. It reads in the data relevant to it from the data link device and accordingly reacts intelligently. One or more units also read data of the control element or elements, react accordingly and optionally relay the relevant data to the other actuators. It can also be provided that one actuator completely assumes the function of the control unit.

Since the drive units can operate without the control unit when the latter fails, a redundancy concept is implemented which continues to operate when the sole control unit fails. The hardware of a second control unit is thus replaced by software in the drive units or actuators.

The present invention moreover involves a system for decoupling defective parts from a bus structure. This second object of the present invention is independent of the above described first object of the present invention in which upon malfunction of the control unit its function is taken over by the actuators. In the system of decoupling defective parts from the bus structure, preferably all actuators and the control elements are series-connected, while in the above described first object of the present invention for the elements of each aircraft seat it has by preference its own bus structure in the form of a tap line.

In the series connection of all actuator and control elements, the two ends of the data link device on the control unit are connected into a physical ring. In the actuators, elements are provided for interrupting the incoming and outgoing lines. This relates both to the data lines and also to the supply lines.

If a short circuit occurs, for example, between the positive and the negative of the power supply lines in the wiring harness of the data link device between two actuators in a conventional system, a short circuit of the power supply units will result causing the failure of the complete seating group. According to the present invention, this failure is avoided by the interruption elements which in this case are opened. By means of the interruption elements, the shorted piece of line between the two actuators is shut off. This arrangement changes the bus from the ring structure into a structure with two tap lines.

This interruption is detected by the control unit which optionally also configures its terminals accordingly.

The data link device can then be provided, which has been separated by the interruption elements with its wave impedance being closed by other contacts of the interruption elements or by additional elements.

Since the data link device at the instant it is turned on is more or less fragmented by the interruption elements in the actuators, the ring is closed by a corresponding start routine.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
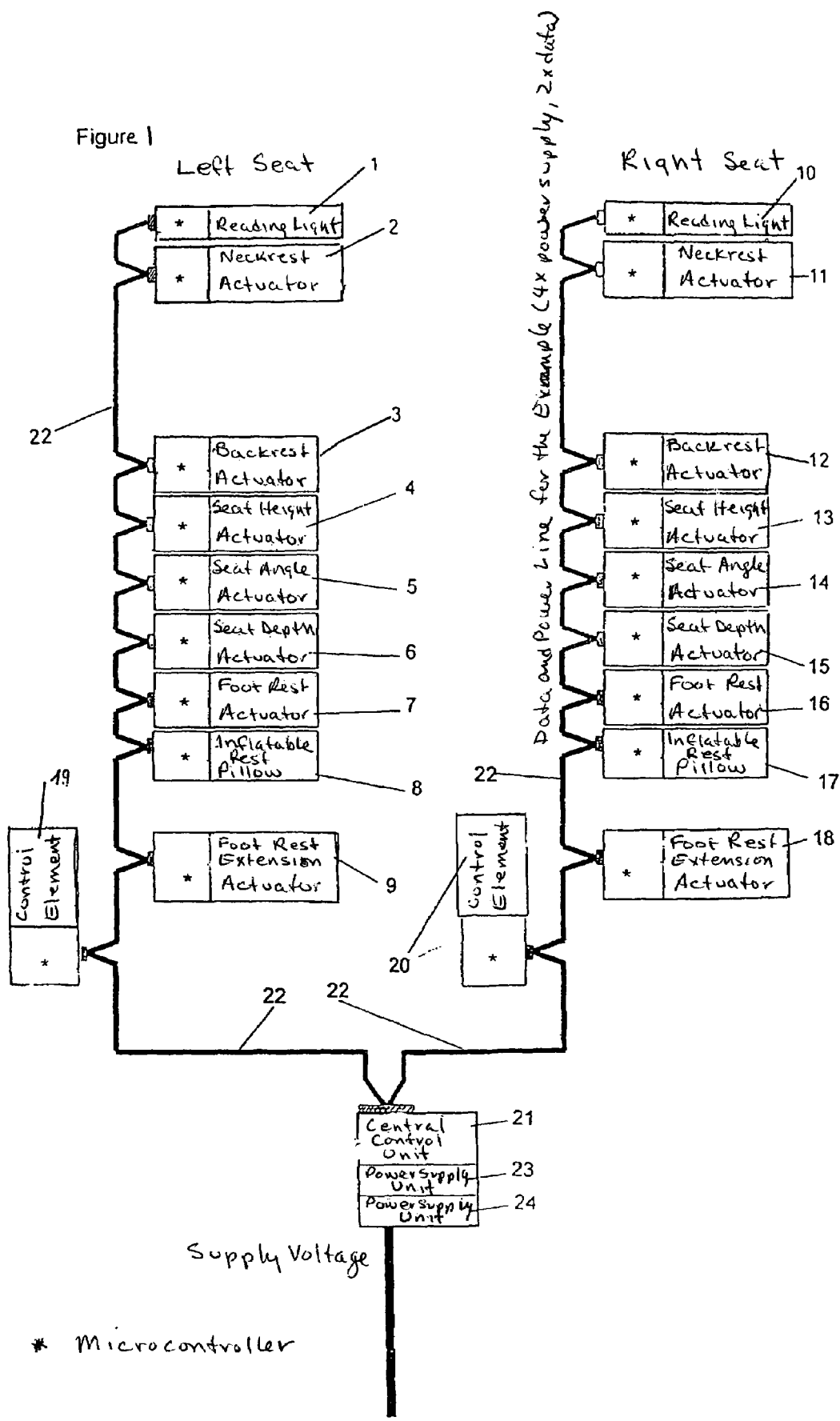
FIG. 1 is a diagram of a system with a control unit and distributed intelligence, according to a first embodiment of the present invention.

In the system shown in FIG. 1, the elements of a left aircraft seat and of a right aircraft seat are each connected by one data link means or device 22 to the common control unit 21.

The actuators 1 to 9 of the left seat and 10 to 18 of the right seat can be the following elements: reading light 1, 10, headrest actuator 2, 11, back rest actuator 3, 12, seat height actuator 4, 13, seat angle actuator 5, 14, seat depth actuator 6, 15, foot rest actuator 7, 14, air system 8, 17, foot rest actuator, external 9, 14. The actuators are each provided with a microcontroller which bears intelligence and manages communication.

The actuators 1 to 9 and 10 to 18 provided for the left seat and the right seat are controlled by a control element 19 or 20. The data from the control elements 19 and 20 are routed by the data link device 22 to the control unit 21. The control unit 21 then in turn triggers a corresponding reaction by the data link device 22 at the respective actuators. This reaction is reported in turn by acknowledgment of the actuators by the data link device 22 to the control unit 21 which monitors and controls the entire sequence of motion.

If the control unit 21 fails, the actuators, by their software, recognize this malfunction. They then assume the function of the control unit by their distributed intelligence. Each actuator 1 to 18 reports its data relevant to the remaining actuators 1 to 18 to the data link device 22. It reads in the data relevant to itself from the data link device 22 and reacts accordingly in an intelligent manner. One or more units also read the data of the control element or elements 18, 19, react accordingly, and optionally relay the relevant data to the other actuators 1 to 18.

The system shown in FIG. 1 contains two power supply units 23, 24. The power supply and data line 22 preferably contains four power cables and two data lines.

Figure 2:
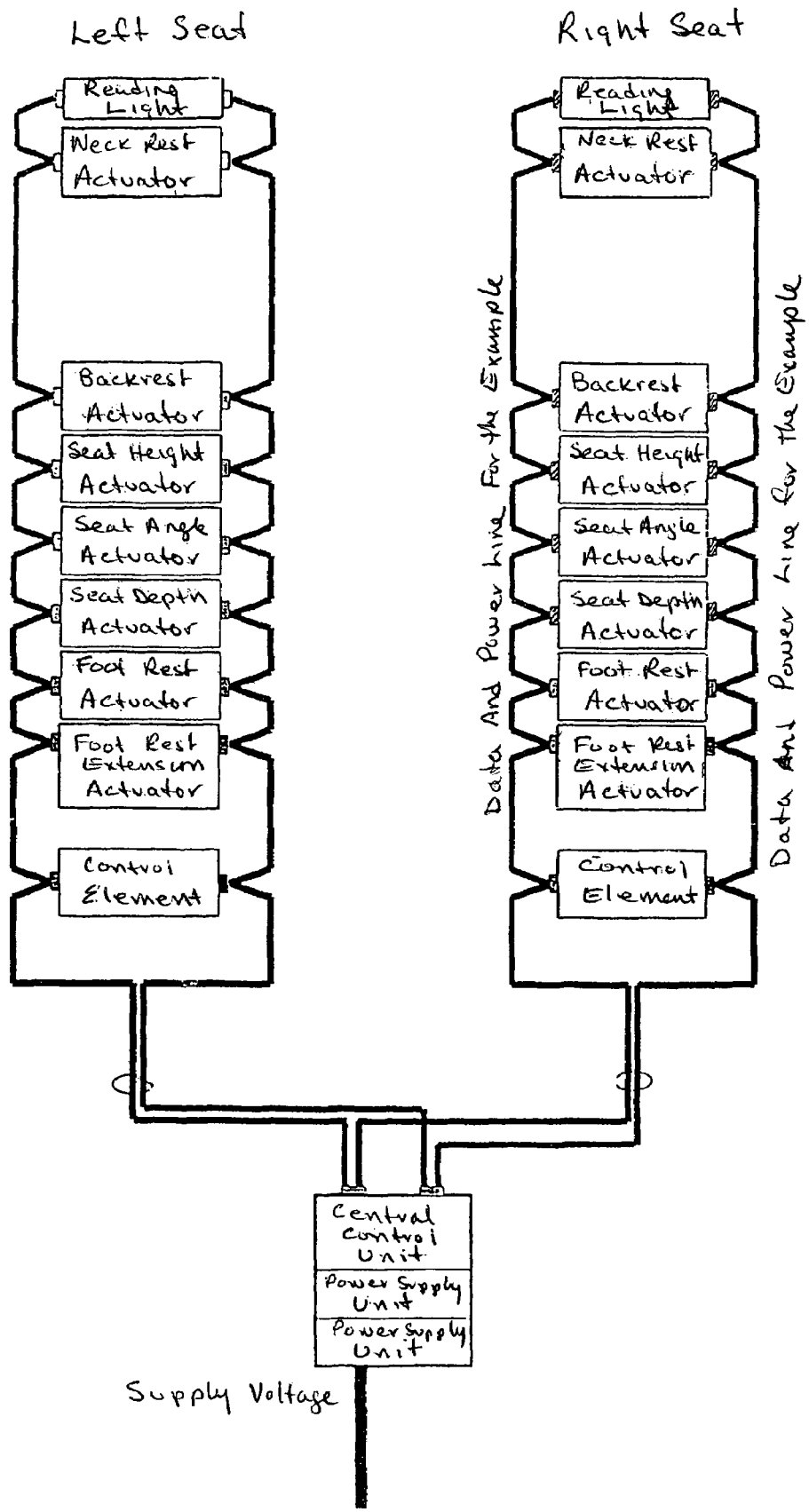
FIG. 2 is a diagram of a bus system, according to a second embodiment of the present invention.

FIG. 2 shows a system in which each actuator is supplied by two wiring harnesses which are spatially and electrically separated. Each wiring harness has two lines for the data bus and two lines for the power supply from the two power supplies. This arrangement has the advantage that there is redundancy for any line fault.

Figure 3:
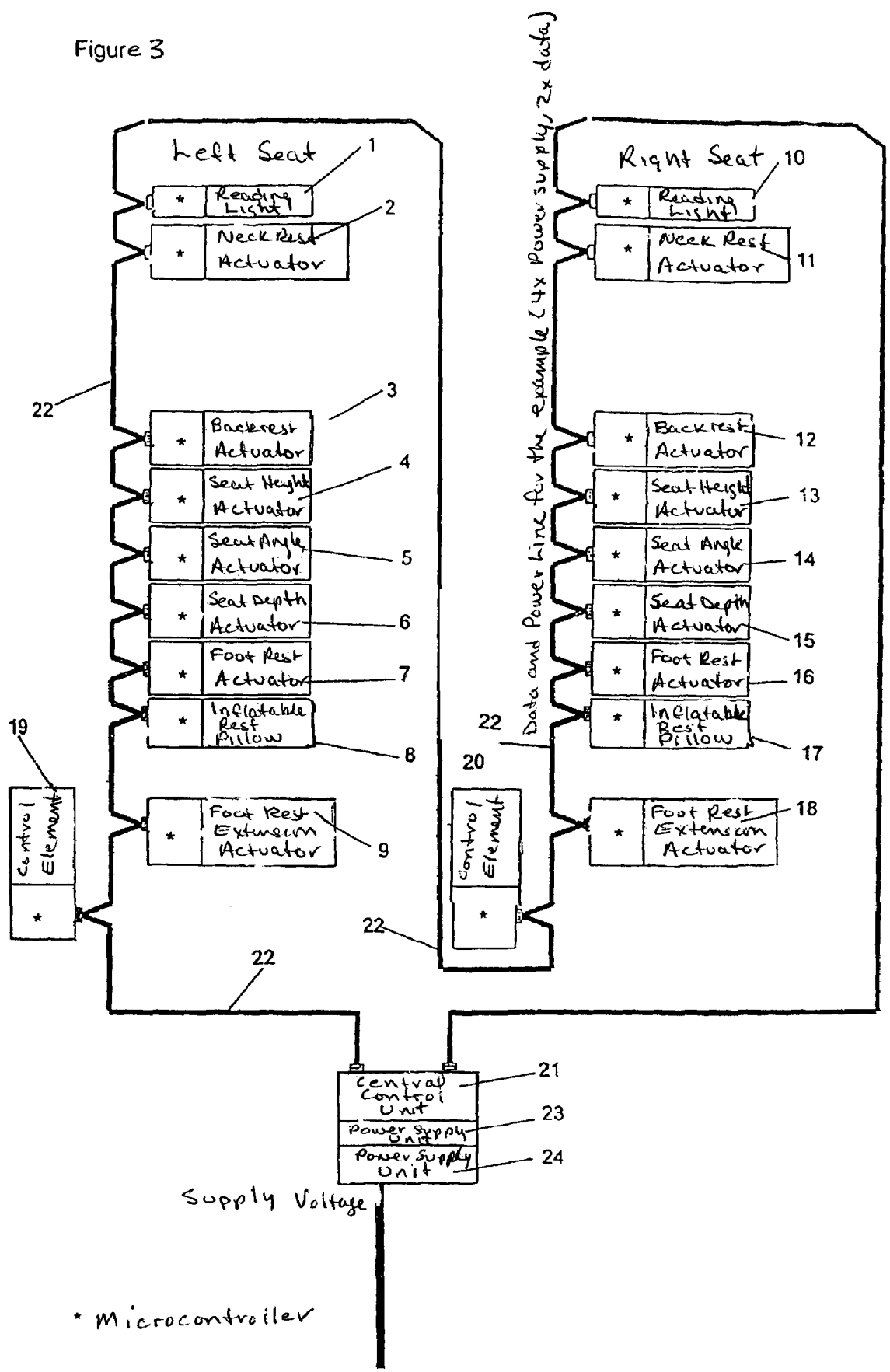
FIG. 3 is a diagram of a bus system, according to a third embodiment of the present invention.

FIG. 3 shows a system with a ring bus structure which is routed through two aircraft seats. Such system can also be used for three or more aircraft seats.

The ring preferably contains four power cables and two data lines. If two power cables run clockwise and the other two power cables run counterclockwise through the bus, this arrangement has the advantage that there is redundancy with respect to the power supply lines.

Figure 4:
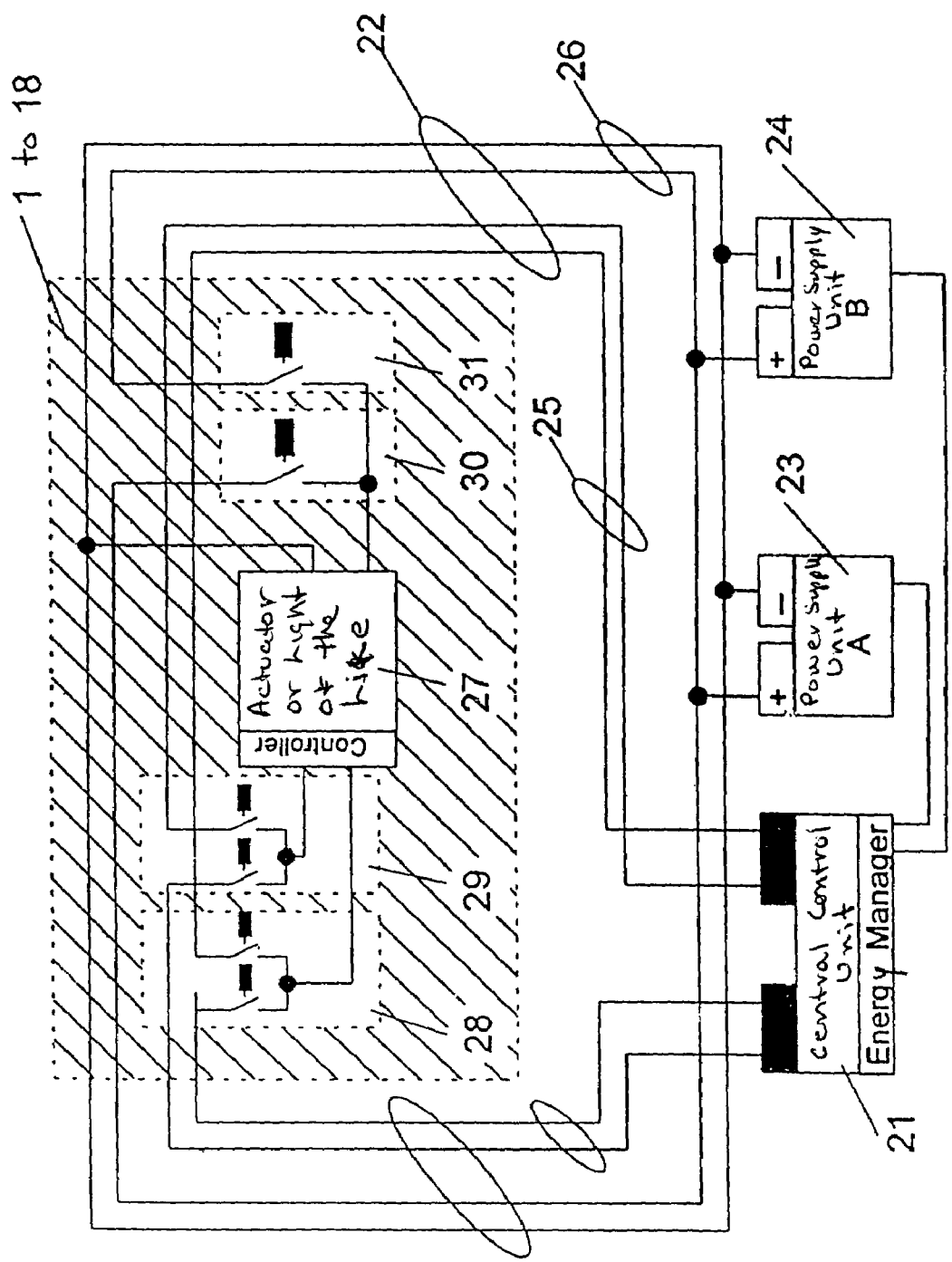
FIG. 4 is a diagram of a circuit in which symbolically only one of the actuators is shown, according to the third embodiment of the present invention.

FIG. 4 shows a circuit for the bus structure shown in FIG. 3. In the figure the broken line shows one of the actuators 1 to 18. In the actuators 1 to 18, there are elements 28 to 31 for interruption of the incoming and outgoing lines. The element 28 interrupts the incoming data line, while the element 29 interrupts the outgoing data line. The corresponding functions are assigned to the elements 30 and 31 for the power supply lines.

The interruption elements have the following function: Let it be assumed that a short circuit between the positive and negative of the power supply lines 26 in the wiring harness of the data link device 22 has occurred between the actuator 3 and the actuator 4. This occurrence would be equivalent to a short circuit of the power supply units 23 and 24 causing the failure of the complete group of seats. Such a short circuit is compensated by the system of the present invention. In this example, the interruption elements 31 and 30 in the actuator 3 are opened. Thus, the short-circuited line piece between the two actuators is turned off. The bus is converted from the ring structure into a structure with two tap lines. The control unit recognizes this and configures its terminals accordingly.

Since the data link device 22 is more or less fragmented at the instant of turning on by the interruption elements 28 to 31 in the actuators 1 to 18, the ring must be closed by a corresponding start routine.

While various embodiments have been chosen to illustrate the invention, it will be understood by those skilled in the art that various changes and modifications can be made therein without departing from the scope of the invention as defined in the appended claims.

What is claimed is:

1. A power supply system for actuators of at least two airplane seats, comprising:
    first actuators of a first aircraft seat;
    second actuators of a second aircraft seat;
    a common control unit;
    at least two power supply units; and
    a data link device connecting said first and second actuators to said common control unit and said power supply units such that each of said actuators can be supplied with power from said two power supply units and such that upon failure of said control unit at least one of said actuators takes over functioning of said control unit with the respective actuator being equipped with corresponding software, said data link device forming a ring bus convertible into a structure with two tap lines upon system malfunction.

2. A power supply system according to claim 1 wherein several of said actuators take over functioning of said control unit by distributed intelligence of said actuators.

3. A power supply system according to claim 1 wherein all of said actuators take over functioning of said control unit by distributed intelligence of said actuators.

4. A power supply system according to claim 1 wherein the two aircraft seats are adjacent to one another.

5. A control and power supply system of at least two aircraft seats, comprising:
    first actuators of a first aircraft seat;
    second actuators of a second aircraft seat;
    a common control unit;
    a data link device connecting said first and second actuators to said common control unit and all of said actuators in series, said data link device forming a ring bus convertible into a structure with two tap lines upon system malfunctioning; and
    elements in each of said actuators for interrupting incoming and outgoing lines to the respective actuator.

6. A control power supply system according to claim 5 wherein
    for each of said actuators, two of said elements are provided for data lines and two of said elements are provided for power supply lines.

7. A control power supply system according to claim 5 wherein
    the two aircraft seats are adjacent to one another.

* * * * *